United States Patent
Vaalburg

[11] 3,736,953
[45] June 5, 1973

[54] LOW PRESSURE CHECK VALVE
[75] Inventor: Thomas T. Vaalburg, Ann Arbor, Mich.
[73] Assignee: Sarns, Inc., Ann Arbor, Mich.
[22] Filed: Nov. 30, 1971
[21] Appl. No.: 203,140

[52] U.S. Cl. ............137/430, 137/525.1, 137/614.2
[51] Int. Cl. .....................F16k 31/18, F16k 15/14
[58] Field of Search....................137/429, 430, 433, 137/525.1, 525.3, 512.3; 138/43–46

[56] References Cited
UNITED STATES PATENTS
2,775,979   1/1957   Stout et al. ...................137/525 X
3,155,110   11/1964  Hoffman.........................137/525 X
3,517,682   6/1970   Smith ...........................137/525.1 X Primary Examiner—Martin P. Schwadron
Assistant Examiner—David R. Matthews
Attorney—Arthur Raisch, John M. Kisselle, Robert A. Choate et al.

[57] ABSTRACT

A low fluid pressure check valve with a one-piece body having a supple diaphragm with a pair of integral spaced lugs extending from one face thereof. A pair of flexible lips of an oval shaped tube which is integral with the diaphragm extend between the lugs to provide a fluid passage through the body of the valve. Displacement of the diaphragm moves the free ends of the lugs toward and away from each other to engage and disengage the lips and thereby close and open the fluid passage.

15 Claims, 7 Drawing Figures

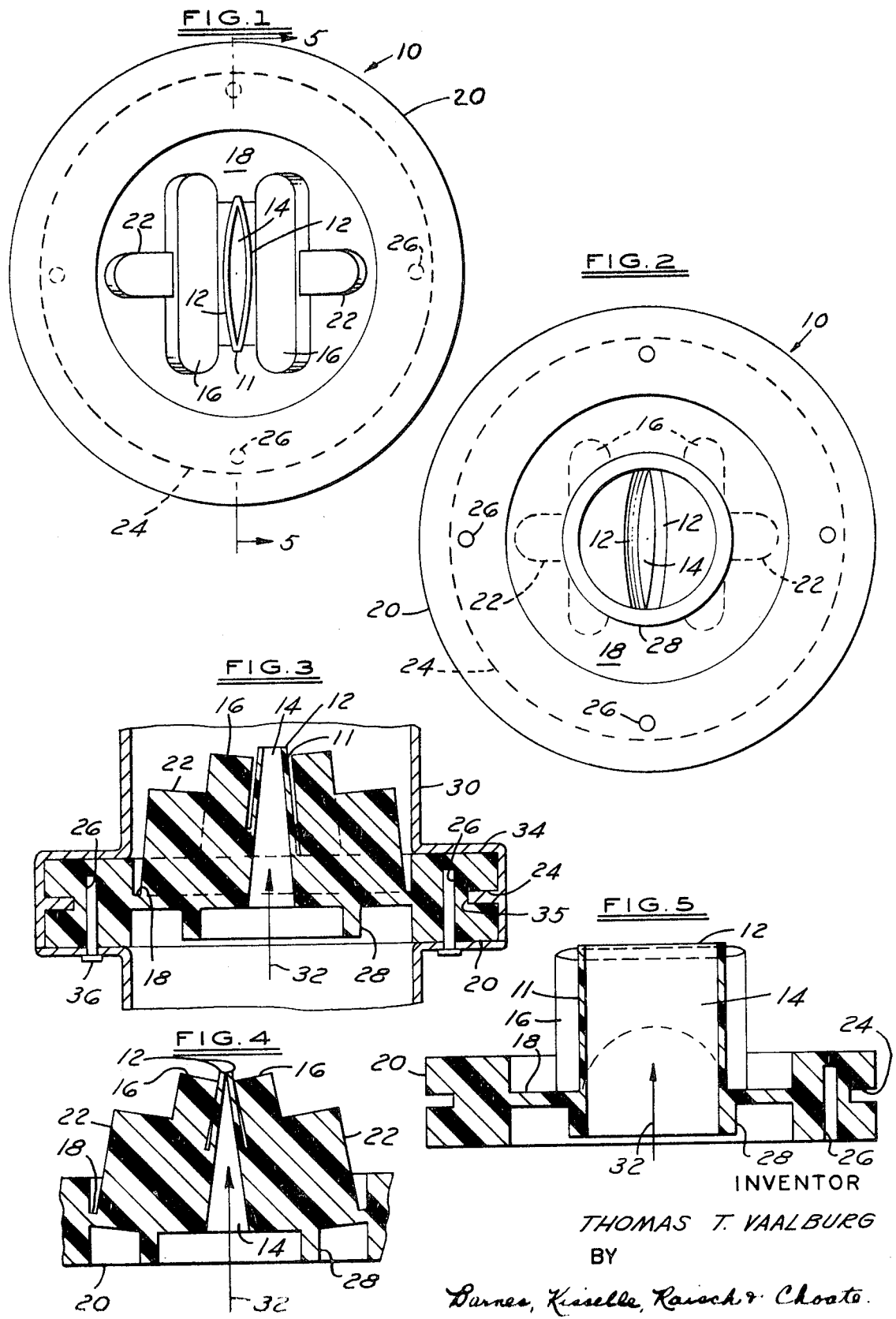

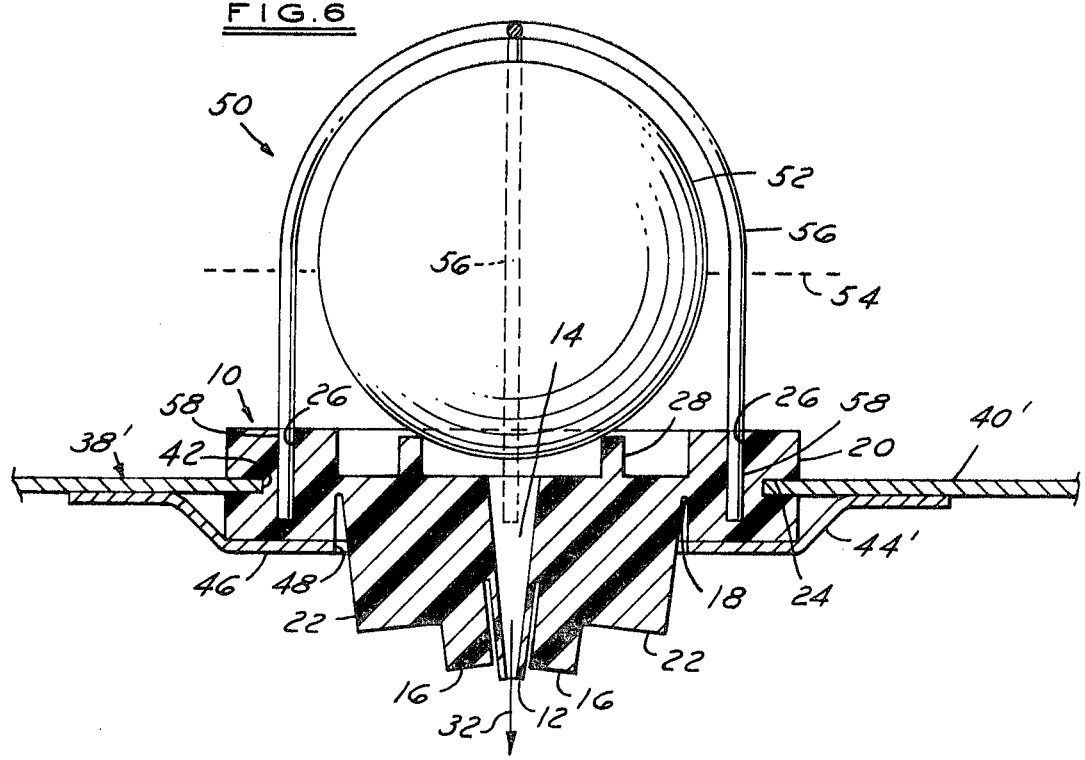
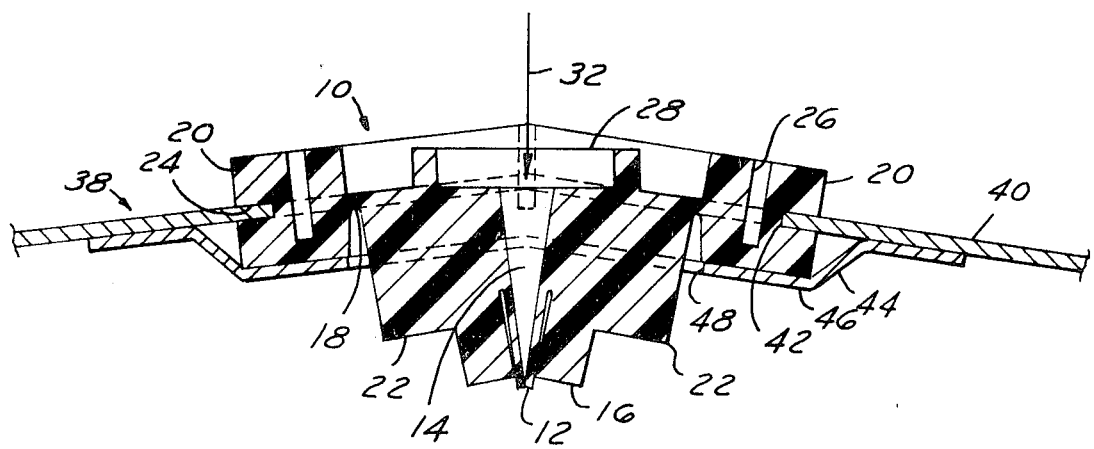

LOW PRESSURE CHECK VALVE

This invention relates to fluid check valves and more particularly to a check valve operable at low fluid pressures in the range of ½ to 60 inches of water.

Objects of this invention are to provide a check valve which will consistently operate satisfactorily with small pressure differentials and which is of economical and durable construction and maintenance free.

These and other objects, features, and advantages of this invention will be apparent from the following description and accompanying drawings in which:

FIG. 1 is a view of the downstream side of a check valve constructed in accordance with this invention.

FIG. 2 is a view of the upstream side of the check valve of FIG. 1.

FIG. 3 is a full sectional view of the check valve of FIG. 1 mounted in a conduit illustrating the parts of the valve in open position.

FIG. 4 is a fragmentary sectional view of the check valve of FIG. 3 illustrating the parts of the valve in closed position.

FIG. 5 is a sectional view of the check valve on line 5—5 of FIG. 1 which is at a right angle to the sectional view of FIG. 3.

FIG. 6 is a full sectional view of a combined ball float and check valve assembly constructed in accordance with this invention.

FIG. 7 is a full sectional view of the check valve of FIG. 1 mounted on a supporting plate assembly illustrating the parts of the valve in closed position.

REFERRING TO THE DRAWINGS

FIGS. 1, 2, 3, and 5 illustrate a check valve 10 constructed in accordance with this invention which has an oval shaped tube 11 with two opposed generally flat lips 12 providing a passage 14 through which liquid can flow. Lips 12 are urged into sealing engagement by the free ends of a pair of spaced lugs 16 in response to a pressure differential on a diaphragm 18 supported on an outer mounting ring 20. Valve 10 is a homogenous one-piece body of a supple resilient synthetic material such as tygon plastic. To facilitate sealing engagement of lips 12, they are positioned between lugs 16 in opposed face-to-face relation to each other and the lugs with their free ends extending slightly beyond lugs 16 as shown in FIGS. 3 and 5. To facilitate generally pivotal movement of the free ends of lugs 16 into engagement with lips 12 in response to displacement of diaphragm 18, lugs 16 are generally planar and extend generally parallel and in spaced relation to lips 12 and are fairly inflexible and rigid in comparison to lips 12 and diaphragm 18. Each lug 16 is made inflexible in comparison to lips 12 by being approximately eight times thicker in cross section than the lips and by being reinforced by a generally transverse rib 22 on the outer surface extending from diaphragm 18 more than two-thirds of the way toward the free end of each lug. Outer mounting ring 20 is integral with diaphragm 18 and has an annular retaining groove 24 in the outer periphery thereof and four equally spaced blind mounting holes 26 in the upstream face of the mounting ring. An integral float valve seat ring 28 on the upstream face of diaphragm 18 encircles passage 14 and underlies and supports spaced lugs 16.

As shown in FIG. 3, check valve 10 can be mounted in a conduit 30 with lips 12 and lugs 16 extending generally axially downstream or in the direction of flow of fluid through the valve as indicated by arrow 32. Valve 10 is mounted in conduit 30 by ring 20 being snugly received in an annular mounting housing assembly 34 with a radial rib 35 extending into groove 24. Valve mounting ring 20 is retained in housing 34 by pins 36 received in blind holes 26 in the mounting ring.

To facilitate molding valve 10 in one piece, lips 12 are formed so that passage 14 is open when the diaphragm is in its normal or undisplaced position. Valve 10 even though formed with passage 14 open can be mounted with lips 12 in sealing engagement and passage 14 closed when diaphragm 18 is in its normal position by distorting mounting ring 20 into a generally V configuration as shown in FIG. 7. Mounting ring 20 is retained in this distorted V configuration by a mounting plate assembly 38 which has a plastic plate 40 with a generally V-shaped cross section with its ridge pointing away from and extending generally parallel to lips 12. Plate 40 has a circular aperture 42 coincident with its ridge and adapted to be received in circumferential groove 24 of mounting ring 20. A generally pan shaped plastic support member 44 with a V-shaped bottom portion 46 with an aperature 48 therein underlies plate 40 and engages a side face of mounting ring 20 to retain the mounting ring in the distorted V configuration. Pan shaped member 44 is fixed to plate 40 such as by heat sealing or gluing.

FIG. 6 illustrates a combined ball float and check valve assembly 50 with check valve 10 received in a mounting plate assembly 38'. Mounting plate assembly 38' is generally similar in construction to mounting plate assembly 38 except that mounting plate 40' and bottom 46' of pan member 44' are flat or each lie in a single plane rather than being formed with a V-shaped cross section. A hollow ball shaped float valve 52 is buoyed in a liquid so long as the liquid level remains above line 54 and is adapted to sealingly engage with valve seat ring 28 when the liquid level drops below line 54. Float ball 52 is retained in generally over-lying axial alignment with seat ring 28 by a cage formed by inverted U-shaped wires 56, the free ends 58 of which are received in mounting holes 26 of ring 20.

In using check valve 10, it can be mounted in a conduit with passage 14 open (as shown in FIGS. 3 and 6) or closed (as shown in FIG. 7) when resilient diaphragm 18 is in its normal position undisplaced by a differential fluid pressure. If valve 10 is formed with lips 12 disengaged, mounting the valve with mounting ring 20 in an undistorted circular configuration in a single plane (FIGS. 3 and 6) will provide a normally open check valve and mounting the valve with ring 20 in a distorted V configuration (FIG. 7) will provide a normally closed check valve as noted above. If valve 10 is normally closed a slight pressure differential on diaphragm 18 with the greater pressure applied to the upstream side will displace the diaphragm in the downstream direction causing the free ends of lugs 16 to move away from each other and disengage lips 12 to open passage 14 and allow fluid to flow through the passage. When this pressure differential displacing diaphragm 18 in the downstream direction is removed, the diaphragm will return to its normal position causing the free ends of lugs 16 to pivot toward each other and into engagement with lips 12 causing the lips to be pinched together and closing passage 14 to check the flow of fluid through the passage. If check valve 10 is installed so that passage 14 is open and lips 12 are disengaged when diaphragm 18 is in its normal position (FIGS. 3 and 6) a slightly greater differential pressure on the downstream side of the diaphragm will move the diaphragm generally axially upstream. This generally axial upstream movement of the diaphragm causes the free ends of lugs 16 to move toward each other and into firm engagement with lips 12 thereby pinching the lips together and closing passage 14 to prevent fluid from flowing through the passage. When this differential pressure is removed, diaphragm 18 will return to its normal position causing the free ends of lugs 16 to move away from each other and disengage from lips 12 thereby opening passage 14 to allow liquid to flow through the passage in the direction of arrow 32. When float and valve assembly 50 is oriented in the position shown in FIG. 6 with a flow of liquid in the direction of arrow 32, ball float 52 is buoyed upward and disengaged from ring 28 to allow liquid to flow past the ball float and into passage 14 so long as the liquid level is above line 54. However, when the liquid level drops below line 54, ball float 52, due to the force of gravity, is urged into sealing engagement with valve seat ring 28 and prevents air or other gases upstream of valve 10 from passing through the valve.

The arrangement of a pair of flexible lips of an oval shaped tube providing a fluid passage of a diaphragm between a pair of opposed spaced lugs carried by the diaphragm for movement of the lugs into engagement with the lips to open and close the passage in response to generally axial displacement of the diaphragm provides a check valve which is consistently responsive and operates satisfactorily at low pressures and with very small pressure differentials. The arrangement of the component parts of the valve so that they can be molded as a one-piece body of a flexible resilient material provides a valve of economical and durable construction which is maintenance free.

I claim:

1. A one-piece check valve of a flexible resilient homogenous material comprising, a resilient flexible diaphragm having a pair of generally opposed pressure responsive faces, a pair of spaced lugs in opposed face-to-face relationship extending from one pressure responsive face of and integral with said diaphragm, a tube with a pair of generally flexible lips extending between said lugs in generally opposed face-to-face relationship with each other and said lugs, said tube being integral with said diaphragm and providing a passage for conducting fluid through said diaphragm, said lips being flexible compared to said lugs and extending between the free ends of said lugs such that a slightly greater pressure differential on said one pressure responsive face of said diaphragm will urge said free ends of said lugs toward each other and into firm engagement with said pair of lips to close said passage provided by said tube and a slightly greater pressure differential on the other of said pressure responsive faces of said diaphragm will urge said free ends of said lugs away from each other and a fluid to flow through said passage provided by said tube.

2. The check valve of claim 1 which also comprises a reinforcing rib integral with each lug.

3. The check valve of claim 2 which also comprises an outer mounting ring encircling, integral and homogeneous with said diaphragm.

4. The check valve of claim 1 which also comprises a reinforcing rib integral with each lug and said diaphragm and extending generally axially on said lug.

5. The check valve of claim 4 which also comprises an outer mounting ring encircling, integral and homogeneous with said diaphragm.

6. The check valve of claim 5 which also comprises a valve seat ring circling said tube and integral with and carried by said diaphragm on a face thereof opposite the face from which said lugs extend, and a float valve adapted for sealing engagement with said seat ring, said float valve carried by said check valve for being buoyed by a liquid to a first position disengaged from said seat ring and moved due to gravity to a second position in sealing engagement with said seat ring when the liquid receeds below a predetermined level.

7. The check valve of claim 1 which also comprises an outer mounting ring encircling, integral and homogeneous with said diaphragm.

8. The check valve of claim 7 in which said diaphragm is generally planar and extends generally perpendicular to the axis of said mounting ring and said pair of lips and said lugs extend generally axially with said lips being disengaged and said passage being open when said mounting ring is in an undistorted condition.

9. The check valve of claim 1 which also comprises a valve seat ring circling said tube and integral with and carried by said diaphragm on a face thereof opposite the face from which said lugs extend, and a float valve adapted for sealing engagement with said seat ring, said float valve carried by said check valve for being buoyed by a liquid to a first position disengaged from said seat ring and moved due to gravity to a second position in sealing engagement with said seat ring when the liquid receeds below a predetermined level.

10. A check valve with a one-piece body of a resilient flexible homogeneous material having an outer mounting ring, a diaphragm integral with said ring lying generally perpendicular to the axis of said ring, a pair of lugs in generally spaced opposed face-to-face relation integral with and extending generally axially from one face of said diaphragm, a tube with a pair of generally flat lips extending between said lugs in generally opposed face-to-face relation with each other and said lugs, said tube being integral with and extending generally axially from said one side of said diaphragm and providing a fluid passage through said diaphragm, said lugs being relatively stiff and inflexible in comparison to said lips and said diaphragm such that a slightly greater differential pressure on said one side of said diaphragm displaces said diaphragm from its normal position and moves the free ends of said lugs toward each other to firmly engage said lips with each other thereby closing said passage to prevent a fluid from flowing through said tube and a slightly greater differential pressure on the other side of said diaphragm moves the free ends of said lugs away from each other to allow said lips to disengage and a fluid to flow through said passage provided by said tube.

11. The check valve of claim 10 which also comprises a reinforcing rib integral with each lug and said diaphragm and extending at least two-thirds of the way from the diaphragm toward the free end of each lug.

12. The check valve of claim 11 which also comprises a mounting means adapted to receive and retain said mounting ring in an undistorted configuration with said lips disengaged and said passage opened when said diaphragm is in its undisplaced position.

13. The check valve of claim 11 which also comprises a mounting plate with a generally V-shaped cross section, said mounting ring of said check valve being received and retained on said plate in a distorted generally V-shaped configuration with the ridge of said plate extending away from and generally parallel to said lips of said check valve to engage said lips and close said passage when said diaphragm is in its undisplaced position.

14. The check valve of claim 10 which also comprises a valve seat ring circling said tube and integral with and carried by said diaphragm on a face thereof opposite the face from which said lugs extend, and a float valve adapted for sealing engagement with said seat ring, said float valve carried by said check valve for being buoyed by a liquid to a first position disengaged from said seat ring and moved due to gravity to a second position in sealing engagement with said seat ring when the liquid receeds below a predetermined level.

15. The check valve of claim 10 which also comprises a mounting plate with a generally V-shaped cross section, said mounting ring of said check valve being received and retained on said plate in a distorted generally V-shaped configuration with the ridge of said plate extending away from and generally parallel to said lips of said check valve to engage said lips and close said passage when said diaphragm is in its undisplaced position.

* * * * *

PO-1050
(5/69)

UNITED STATES PATENT OFFICE
CERTIFICATE OF CORRECTION

Patent No. __3,736,953__     Dated __June 5, 1973__

Inventor(s) __Thomas T. Vaalburg__

It is certified that error appears in the above-identified patent and that said Letters Patent are hereby corrected as shown below:

Col. 3, line 51, before "fluid" insert -- a --.

Col. 3, line 61, change "and" to -- to allow --.

Col. 4, line 22, after "ring" insert a comma (,).

Col. 4, line 25, after "condition" insert -- without any pressure differential on said diaphragm --.

Col. 8, lines 47, 51, 57, change "side" to -- face --.

Signed and sealed this 18th day of December 1973.

(SEAL)
Attest:

EDWARD M. FLETCHER, JR.
Attesting Officer

RENE D. TEGTMEYER
Acting Commissioner of Patents